L. DERBY.
Thill-Coupling.
No. 69,190.
Patented Sept. 24, 1867.
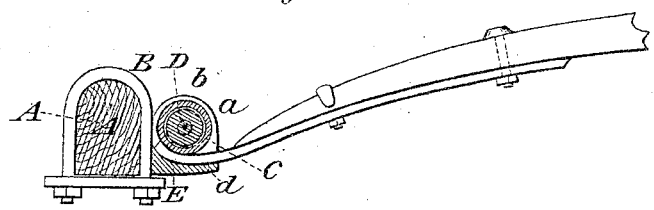
Fig. 1.
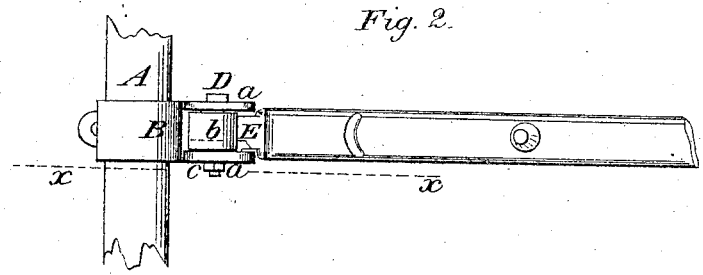
Fig. 2.
Witnesses.
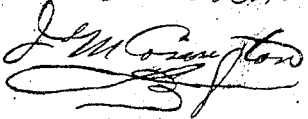
Inventor.
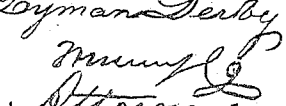

United States Patent Office.

LYMAN DERBY, OF NEW YORK, N. Y.

*Letters Patent No. 69,190, dated September 24, 1867.*

---

IMPROVEMENT IN THILL-COUPLING.

---

*The Schedule referred to in these Letters Patent and making part of the same.*

---

TO ALL WHOM IT MAY CONCERN:

Be it known that I, LYMAN DERBY, of the city, county, and State of New York, have invented a new and improved Thill-Coupling, and that the following description, taken in connection with the accompanying drawings, hereinafter referred to, forms a full and exact specification of the same, wherein I have set forth the nature and principles of my said improvements, by which my invention may be distinguished from all others of a similar class, together with such parts as I claim, and desire to have secured to me by Letters Patent.

This invention relates to a new and improved mode of securing thills to axles, whereby the former may be readily applied to and detached from the latter, and at the same time a secure connection obtained, one that will not admit of a casual detachment of the thills from the axle. In the accompanying sheet of drawings—

Figure 1 is a side sectional view of my invention, taken in the line $x\,x$, fig. 2.

Figure 2, a plan or top view of the same.

Similar letters of reference indicate like parts.

A represents a portion of the front axle of a vehicle, and B a clip fitted thereon, having two parallel ears or lugs $a\,a$ projecting from its front end, between which a metal roller, C, covered with India rubber $b$, is fitted and allowed to turn freely, the roller being placed on a bolt, D, which passes horizontally through the ears or lugs $a\,a$, and secured in position by a screw-nut, $c$, on one end. The lugs $a\,a$ have a bottom plate, $d$, firmly secured between them, the upper surface of said plate being slightly curved in a longitudinal direction, as shown clearly in fig. 1. E represents the thill-iron, which extends back beyond the rear end of the thill in a curved form, as shown in fig. 1. This curved part is inserted between the bottom plate $d$ of the ears or lugs $a\,a$ and the roller C by raising the thills, and as the latter are let down to the line of draught, or further, so that their outer ends will come in contact with the ground, the iron E will bind or catch between the roller and bottom plate and form a secure connection of the thill to the axle, effectually preventing the casual detachment of the former from the latter. In order to detach the thills all that is required is simply to raise the thills some distance above the line of draught, or the position they occupy when the horse is attached to the vehicle, and the iron E may be readily drawn out from between the roller and bottom plate. This invention does not admit of any rattling of the parts of the coupling, and it may be constructed at a very moderate cost.

Having thus described my invention, I claim as new, and desire to secure by Letters Patent—

The curved thill-iron E, in combination with the roller C, covered with India rubber or other suitable material, and fitted between lugs or ears $a\,a$ at the front side of the clip B, and the bottom plate $a$ of the lugs or ears, curved at its upper surface, substantially as shown and described.

LYMAN DERBY.

Witnesses:
WM. F. MCNAMARA,
ALEX. F. ROBERTS.